(12) United States Patent
Simonini

(10) Patent No.: US 8,827,867 B1
(45) Date of Patent: Sep. 9, 2014

(54) TRANSMISSION CONTROL SYSTEM FOR AN ELECTRIC VEHICLE

(71) Applicant: Proterra Inc., Greenville, SC (US)

(72) Inventor: Matthew Simonini, Greenville, SC (US)

(73) Assignee: Proterra, Inc., Greenville, SC (US)

( * ) Notice: Subject to any disclaimer, the term of this patent is extended or adjusted under 35 U.S.C. 154(b) by 0 days.

(21) Appl. No.: 14/179,388

(22) Filed: Feb. 12, 2014

(51) Int. Cl.
  *F16H 3/12* (2006.01)
(52) U.S. Cl.
  USPC .............................................. 477/15; 477/20
(58) Field of Classification Search
  USPC ...................................................... 477/20, 15
  See application file for complete search history.

(56) References Cited

U.S. PATENT DOCUMENTS

| | | | |
|---|---|---|---|
| 4,021,712 A * | 5/1977 | Ishihara et al. | ............... 318/432 |
| 4,823,596 A | 4/1989 | Meyers et al. | |
| 5,027,647 A | 7/1991 | Shimanaka | |
| 5,498,216 A * | 3/1996 | Bitsche et al. | ................... 477/20 |
| 5,807,205 A * | 9/1998 | Odaka et al. | ..................... 477/29 |
| 6,976,388 B2 | 12/2005 | Heap et al. | |
| 7,617,896 B2 * | 11/2009 | Ogata | .......................... 180/65.7 |
| 7,886,863 B2 | 2/2011 | Marsh et al. | |
| 8,001,848 B2 | 8/2011 | White et al. | |
| 8,010,265 B2 | 8/2011 | Samie et al. | |
| 8,157,037 B2 | 4/2012 | Reed et al. | |
| 8,251,867 B2 * | 8/2012 | Reith et al. | ..................... 477/15 |
| 8,260,509 B2 | 9/2012 | Reedy et al. | |
| 8,272,993 B2 * | 9/2012 | Kaltenbach et al. | .............. 477/8 |
| 2012/0010043 A1 * | 1/2012 | Inagaki et al. | .................. 477/20 |
| 2013/0045832 A1 | 2/2013 | Whitney et al. | |

* cited by examiner

*Primary Examiner* — Sherry Estremsky
(74) *Attorney, Agent, or Firm* — Bookoff McAndrews, PLLC

(57) ABSTRACT

A method of controlling a transmission of a vehicle powered by an electric motor may include initiating a gear engagement in the transmission. The method may also include activating a torque jog in the electric motor to assist with the gear engagement. The torque jog may include a fluctuation in the torque output of the electric motor.

27 Claims, 7 Drawing Sheets

TRANSMISSION CONTROL SYSTEM FOR AN ELECTRIC VEHICLE

TECHNICAL FIELD

Embodiments of this disclosure relate to methods and devices to promote gear engagement in the transmission of an electric vehicle.

BACKGROUND

The powertrain of a motor vehicle refers to a group of components that generate and deliver power to the road surface to propel the vehicle along the road. In general, the powertrain includes a power source that generates or provides power, and a transmission that transmits the power to the drive wheels of the vehicle. The transmission is a speed and torque changing device that converts the speed and torque produced by the power source to that desired by the vehicle. Typically, an input shaft (or drive shaft) inputs the power from the power source to the transmission and an output shaft outputs the power from the transmission. The output shaft is connected to the driving wheels through a differential. The transmission includes multiple gears that selectively engage or mesh to convert the speed/torque produced by the power source to that suitable for different driving conditions (accelerating, cruising, etc.). The operator of the vehicle, or a control unit of the vehicle, may initiate a gear change in the transmission in response to driving conditions.

When the power source of the vehicle is an internal combustion engine, the naturally occurring vibrations or torque fluctuations in the input shaft assist in engaging (or meshing) the gears in the transmission. However, when the power source is an electric motor, the input shaft may not carry sufficient vibrations and fluctuations to assist in gear engagement. Further, the speed of the input shaft may be more accurately controller by an electric motor. These properties of electric motor drives may result in binding or partial engagement of the gears in the transmission. Binding or partial engagement of the gears may cause damage to the transmission and decrease vehicle reliability due to failure to transfer power efficiently to the wheels. Embodiments of the current disclosure may alleviate the problems discussed above and/or other problems in the art. The scope of the current disclosure, however, is defined by the attached claims, and not by the ability to solve any specific problem.

SUMMARY

Embodiments of the present disclosure relate to, among other things, devices and methods for controlling the transmission of an electric vehicle, and electric vehicles that incorporate the control methodology. Each of the embodiments disclosed herein may include one or more of the features described in connection with any of the other disclosed embodiments.

In one embodiment, a method of controlling a transmission of a vehicle powered by an electric motor is disclosed. The method may include initiating a gear engagement in the transmission. The method may also include activating a torque jog in the electric motor to assist with the gear engagement. The torque jog may include a fluctuation in the torque output of the electric motor.

In another embodiment, a method of controlling a transmission of a vehicle powered by an electric motor is disclosed. The method may include initiating a gear engagement in the transmission, and determining whether or not a successful gear engagement occurred in response to the initiation. The method may also include activating a torque jog in the electric motor based on the determination. The torque jog may include a fluctuation in the torque output of the electric motor to assist with the gear engagement.

In yet another embodiment, an electric vehicle is disclosed. The electric vehicle may include an electric motor configured to provide traction for the electric vehicle, a transmission including a plurality of gears coupled to the electric motor, and a control unit operatively coupled to the transmission and the electric motor. The control unit may be configured to initiate a gear engagement in the transmission, and activate a torque jog in the electric motor to assist with the gear engagement. The torque jog may include a fluctuation in the torque output of the electric motor.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes a control system for the transmission of an electric vehicle, and methods for controlling the transmission. While principles of the current disclosure are described with reference to an electric bus, it should be understood that the disclosure is not limited thereto. Rather, the systems and methods of the present disclosure may be used in any electric vehicle or machine that includes engaging gears.

Figure 1:
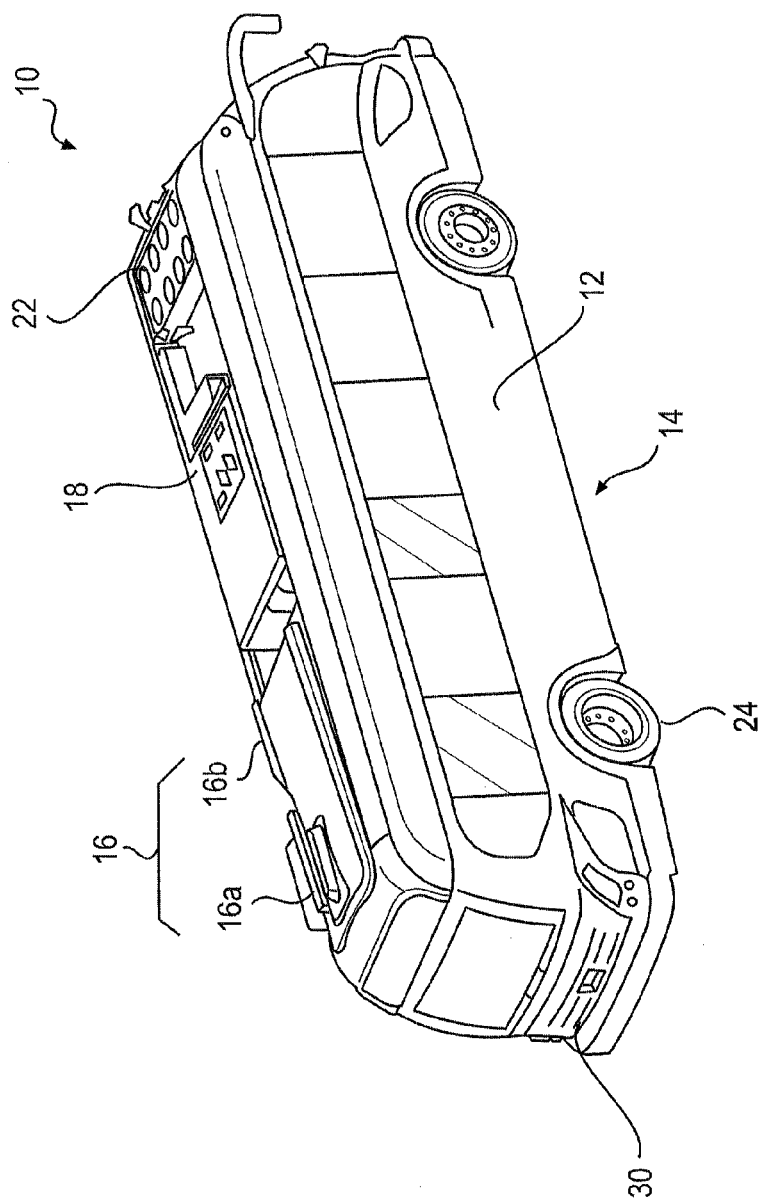
FIG. 1 is an illustration of an exemplary electric bus.

FIG. 1 illustrates an electric vehicle in the form of an electric bus 10. Electric bus 10 may include a body enclosing a space for passengers. In some embodiments, some (or all) parts of body 12 may be fabricated using one or more composite materials to reduce the weight of bus 10. Without limitation, body 12 of bus 10 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface. In this disclosure, the term "about" is used to indicate a possible variation of ±10% in a stated numeric value.

Bus 10 may include a powertrain 30 that propels the bus 10 along a road surface. Powertrain 30 may include an electric motor 38 (FIG. 2) that generates power, and a transmission 40 (FIG. 2) that transmits the power to drive wheels 24 of the bus 10. Batteries 14 may store electrical energy to power the electric motor 38. In some embodiments, these batteries 14 may be positioned under the floor of the bus 10, and may be configured as a plurality of battery packs. These battery packs may be positioned in spaced apart cavities (not shown) located under the floor of the bus 10. The batteries 14 may have any chemistry and construction. In some embodiments, the batteries may be lithium titanate batteries. Lithium titanate batteries may enable fast charging of the batteries 14. It is also contemplated that, in some embodiments, the batteries 14 may include multiple different chemistries. For instance, some of the batteries 14 may be lithium titanate batteries, while others may have another chemistry (for example, lead-acid, nickel cadmium, nickel metal hydride, lithium ion, zinc air, etc.). Some of the possible battery chemistries and arrangements in bus 10 are described in commonly assigned U.S. Pat. No. 8,453,773 which is incorporated herein by reference in its entirety. Although batteries 14 are described as being positioned under the floor of the bus 10, this is only exemplary. In some embodiments, some or all of the batteries 14 may be positioned elsewhere on the bus 10. For example, some or all of the batteries 14 may be positioned on the roof of bus 10.

A charging interface 16 may be provided on the roof of the bus 10 to charge the batteries 14. The charging interface 16 may include components that interface with an external charging station to charge the batteries 14. These components may include a charging blade 16a and an alignment scoop 16b. The alignment scoop 16b may align and direct a charging brace (not shown) of the external charging station (not shown) towards the charging blade 16a to electrically connect them and charge the batteries 14. Some possible embodiments of charging interfaces 16 that may be used for bus 10 are described in commonly-assigned International Application PCT/US2010/061862 (Publication No. WO/2011/079215) filed on Dec. 22, 2010, which is incorporated by reference in its entirety herein. Alternatively or additionally, bus 10 may also include an on-board charging device to charge the batteries 14. The on-board charging device may include an auxiliary power generation device (such as, an internal combustion engine or a fuel cell positioned, for example, on the roof) that generates power to charge the batteries 14. In some embodiments, bus 10 may be a pure electric vehicle and thus does not include an internal combustion engine.

Bus 10 may also include components such as an HVAC system 18 to cool the passenger compartment, and a radiator 22 to cool the heat producing components of bus 10. A coolant may circulate between the radiator 22 and the heat producing components (such as, for example, motor, batteries, etc.) to dissipate heat produced by these components. Although the HVAC system 18, the radiator 22, and the charging interface 16 are illustrated as being positioned on the roof of the bus 10, in general, these components may be positioned anywhere on the bus 10.

Figure 2:
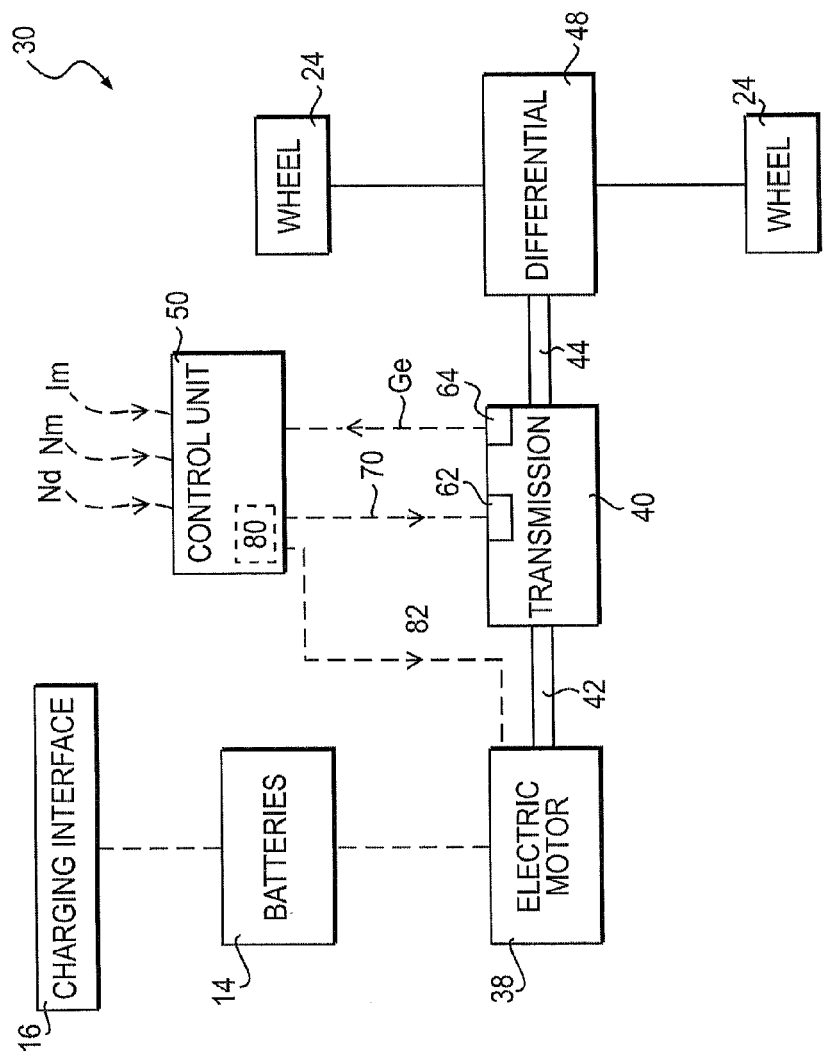
FIG. 2 is a schematic illustration of an exemplary power train system of the bus of FIG. 1.

FIG. 2 is a schematic illustration of the powertrain 30 coupled to the drive wheels 24 of the bus 10 through the transmission 40. Powertrain 30 may be powered by an electric motor 38. The electric motor 38 may be a permanent magnet AC motor that operates using power from the batteries 14. In some embodiments, high voltage DC power from the batteries 14 may be converted into 3-phase AC power (using an inverter, not shown) and directed to electric motor 38, to drive the motor 38, and rotate the input shaft 42. In general, the torque output of the electric motor 38 is proportional to the magnitude of the current directed to the electric motor 38. Although the electric motor 38 is described as a permanent magnet AC motor, other types of motors may be used in powertrain 30. In some embodiments, bus 10 may include multiple power sources such as batteries and one or more fuel cells.

The transmission 40 may include a plurality of gears 60 (see FIGS. 3A and 3B) with the ability to switch between different gear ratios to convert the rotation speed (and torque) of the input shaft 42 to several different speeds (and torques) of the output shaft 44. While, in general, any type of transmission 40 with any number of gear ratios may be used in bus 10, in some embodiments, transmission 40 may be an automated manual transmission that provides two gear ratios using a set of planetary gears. As is known in the art, the planetary gears may include sun, ring, and carrier gears with planetary gears coupled thereto. Transmission 40 may also include a plurality of clutches (not shown) adapted to selectively couple several of the gears 60 together to change the gear ratio between the input shaft 42 and the output shaft 44 based on instructions from the control unit 50. Additionally, as is known in the art, transmission 40 may include other devices such as, for example, synchronizers that equalize the speed difference between the input and output shafts 42, 44. Control unit 50 may selectively activate the different gear ratios of the transmission 40 by any known method. In some embodiments, the control unit 50 may selectively activate the different gear ratios by using electrical signals. For instance, the control unit 50 may direct electrical signals to energize one or more valves or actuators (not shown) for shifting elements to move different gears of the transmission 40 into and out of engagement. Since methods used by a control unit to activate different gear ratios of a transmission are well known in the art, for the sake of brevity, these methods are not discussed in more detail herein.

The different gear ratios of transmission 40 may include a low speed configuration (low gear) and a high speed configuration (high gear). In low gear, the speed of rotation of the output shaft 44 ($N_{44}$) may be lower than the speed of rotation of the input shaft 42 ($N_{42}$) (that is, $N_{44} < N_{42}$). In high gear, $N_{44}$ may be greater than or equal to $N_{42}$ (that is, $N_{44} \geq N_{42}$). Transmission 40 may also include a neutral configuration in which the gears 60 decouple the input and the output shafts 42, 44. The low and high gears may be activated by engaging (and/or disengaging) selected gears and clutches of transmission 40 to obtain two different gear ratios between the input and output shafts 42, 44. The two gear ratios convert the speed of the input shaft 42 to two different speeds of the output shaft 44.

Control unit 50 may be a device dedicated to control operations of the powertrain 30, or it may be part of a device that controls several operations (for example, HVAC control, door opening/closing, kneeling, etc.) of the bus 10. As is known in the art, control unit 50 may include a collection of several mechanical, electrical, and integrated circuit devices (for example, computational units, A/D converters, memory, switch, valves, actuators, fuses, etc.) that function collectively to control the operation of transmission 40. Control unit 50 may selectively engage and disengage multiple gears in the transmission 40 based on data indicative of the operating conditions of bus 10. The operating condition data may include, among others, signals indicative of desired motive speed $N_d$, motor speed $N_m$, and motor input current $I_m$ (or motor torque). The desired speed $N_d$ may be determined based on operator input (for example, based on the position of the accelerator), or may be computed/determined based on other data (efficiency curves, etc.). Motor speed $N_m$ and motor input current $I_m$ data may be signals indicative of the existing speed of the electric motor 38 and the electric current input into the motor 38. Based on this data, the control unit 50 may transmit instructions 70 to the transmission 40 to switch to low gear or high gear.

Figure 3B:
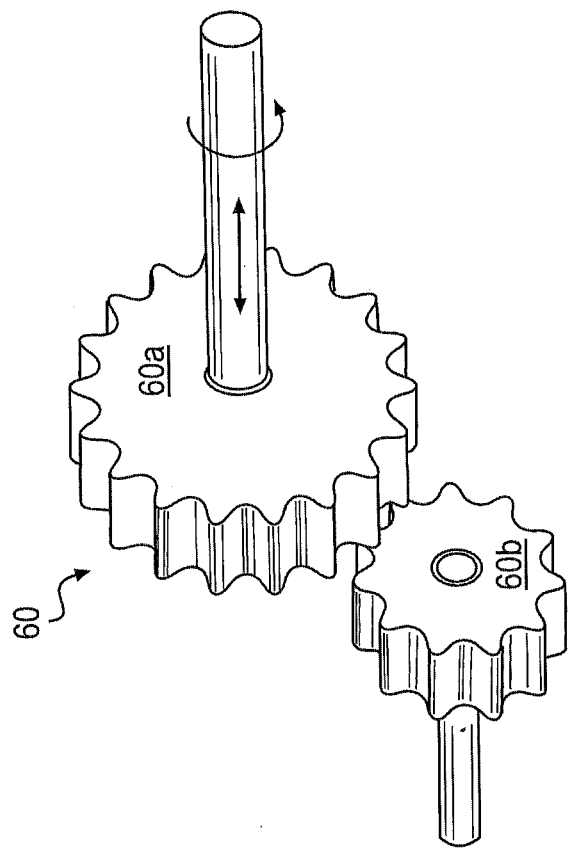
FIG. 3B is a schematic illustration of two binding gears of the bus of FIG. 1.
Figure 3A:
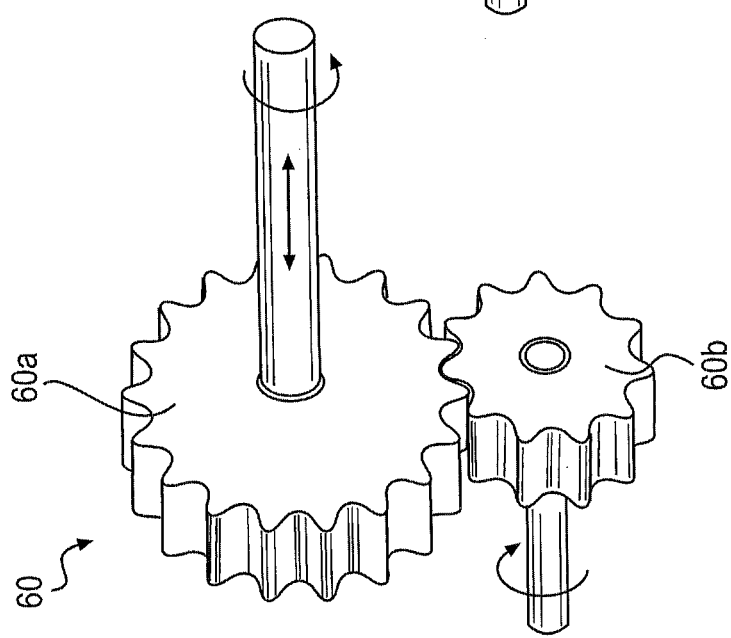
FIG. 3A is a schematic illustration of two engaging gears of the bus of FIG. 1.

These instructions 70 may include directing electrical signals to energize one or more solenoids to move actuators and/or shifting elements 62 (see FIGS. 4A and 4B) to bring different gears 60 (see FIGS. 3A and 3B) of the transmission 40 into, and out of, engagement. FIG. 3A schematically illustrates two gears 60a and 60b of transmission 40 in engagement in response to an instruction 70 from the control unit 50. For the sake of clarity, only portions of the transmission 40 that are relevant to this discussion are schematically illustrated in FIG. 3A. In response to instruction 70, an actuator (not shown) may move a shifting element 62 (see FIGS. 4A and 4B) to a position in which gear 60a engages with gear 60b. When the gears 60a, 60b engage, rotation (and force) is smoothly transmitted from gear 60a to gear 60b. However, in some instances, gears 60a and 60b may not completely engage. For instance, as illustrated in FIG. 3B, when the teeth of the two gears 60a and 60b are not aligned to permit meshing of their respective gear teeth, the gears 60a and 60b may not completely engage. Instead, mating faces of two gears 60a, 60b may collide and fail to engage (or bind). In this configuration, rotation and force may not be transmitted between the gears. It should be noted that, in some configurations of transmission 40, the gears may only partially engage when the gear teeth are not aligned. When the gears are partially engaged, rotation and force may not be smoothly transmitted between the gears.

Figure 4A:
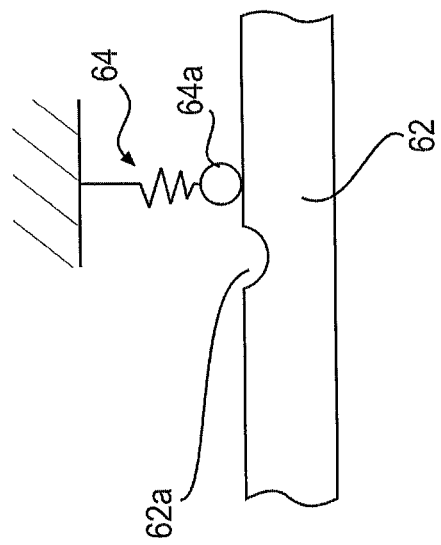
FIGS. 4A and 4B illustrate an exemplary sensor used to detect gear engagement in the bus of FIG. 1.
Figure 4B:
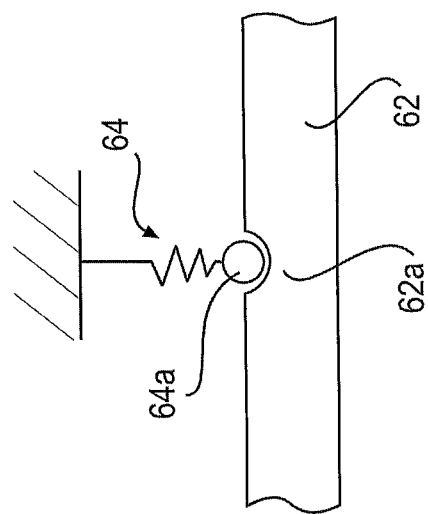

With reference to FIGS. 2, 4A, and 4B, one or more sensors 64 associated with the transmission 40 may detect whether or not the gears 60a, 60b engage, and relay this data to the control unit 50 by way of a gear engagement signal $G_e$. Any type of sensor 64 configured to detect engagement of gears 60a and 60b may be used as sensor 64. In some embodiments, sensor 64 may be a position sensor that detects whether (or not) the gears 60a, 60b are in engagement based on a position of shifting element 62. For example, in some embodiments, when the shifting element 62 moves into a position corresponding to engagement of the gears 60a, 60b, a biased ball 64a may descent into a groove 62a in the shifting element 62 (see FIG. 4A) to indicate gear engagement. In contrast, when gears 60a, 60b do not successfully engage (that is, do not engage or only partially engages), the ball 64a may not descent into the groove 62a (see FIG. 4B). Based on the gear engagement signal $G_e$ from sensor 64, the control unit 50 may detect whether or not the gears of the transmission 40 successfully engaged in response to an instruction 70 (see FIG. 2) from the control unit 50. In some embodiments, different sensors may detect whether the gears 60 engage in high gear and in low gear. While in other embodiments, a single sensor may be configured to detect whether the gears 60 engage in both the high and low gears.

When the control unit 50 initiates a gear engagement (instruction 70), it may also activate a torque jog algorithm 80 to promote gear engagement (see FIG. 2). In some embodiments, the torque jog algorithm 80 may only be activated if the gears 60 have not successfully engaged within an expected time after sending an instruction to engage the gears (that is, after initiation of gear engagement). In some embodiments, the control unit 50 may activate the torque jog algorithm 80 every time gear engagement is initiated. The torque jog algorithm 80 may control the electric motor 38 to induce a momentary fluctuation (bump, jerk, twitch, etc.) in the torque output by the electric motor 38. The resulting fluctuation of torque in the input shaft 42 may induce a change in speed of the input shaft 42 and cause relative rotation between the gears 60a, 60b. This relative rotation between the gears may assist in gear engagement. This momentary torque fluctuation of the electric motor 38 is referred to herein as a torque jog. The torque jog may be induced by providing a varying pattern of electric current to the electric motor 38 to induce a momentary change in torque output of the motor 38.

Figure 5A:
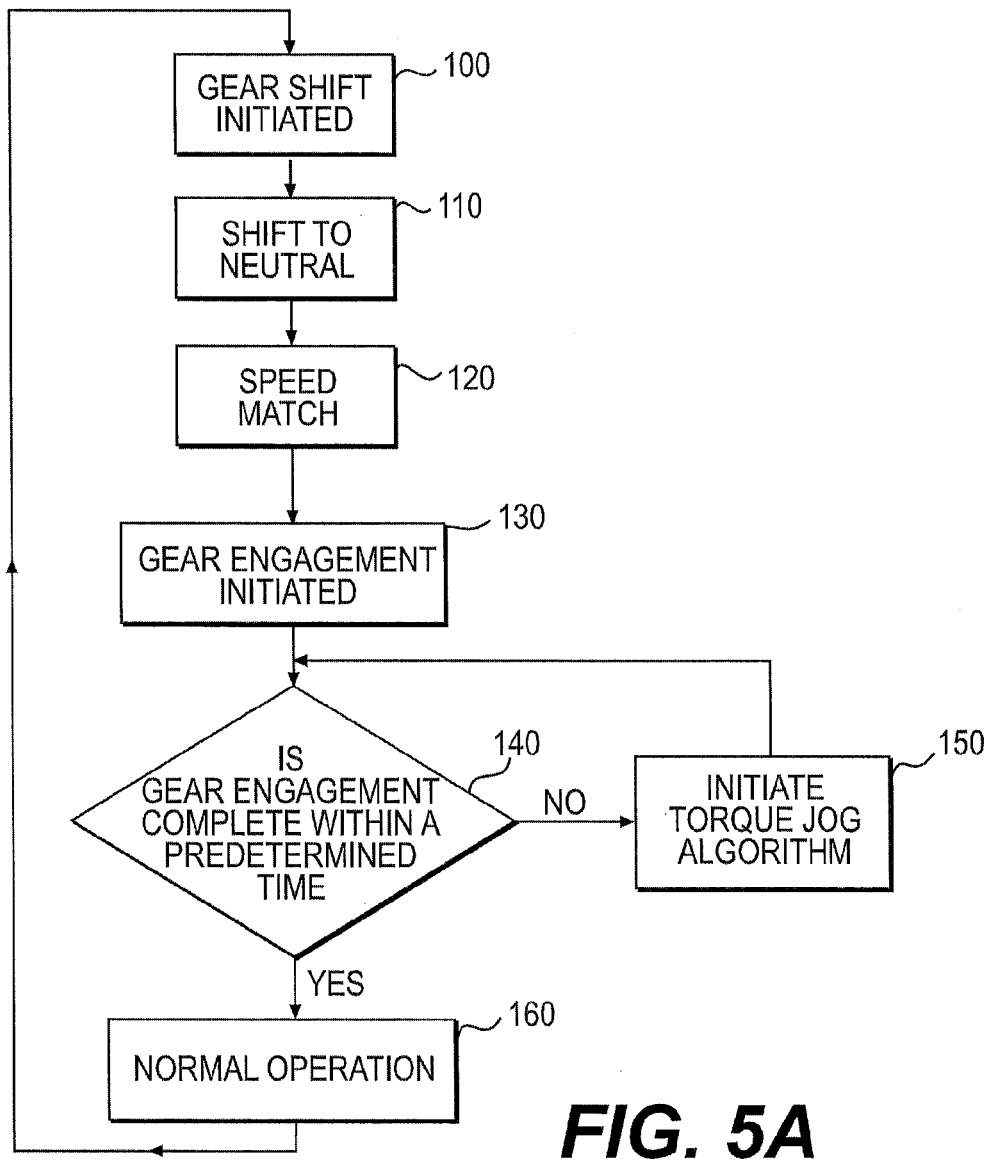
FIG. 5A is a flow chart illustrating an exemplary method of gear shifting in the bus of FIG. 1.

FIG. 5A is a flow chart that illustrates an exemplary gear engagement method of the control unit 50. Based on operator input and/or other input (bus speed and other operational parameters of bus), the control unit 50 may initiate a gear shift in transmission 40 (step 100). For example, based on input (operator, sensor, etc.), the control unit 50 may initiate a gear shift in the transmission 40 from low gear to high gear. After gear shift initiation, the control unit 50 may shift gears to neutral (step 110) by decreasing the motor current input to reduce the motor output torque to zero (or a very low value). The control unit 50 may then control the current to the electric motor 38 to make the speed of the input shaft 42 approximately equal to the rotating gear component speed for the desired gear ratio (step 120). The control unit 50 may then initiate gear engagement (step 130). In this step, the controller may transmit instructions (for example, to a solenoid) to engage two or more gears in the transmission 40.

After initiating gear engagement (step 130), the control unit 50 may determine if the requested gear engagement is complete within a predetermined time (step 140). In some embodiments, the control unit 50 may wait for a predetermined amount of time for a signal indicating a successful gear engagement. The predetermined amount of time may be the expected amount of time for completion of gear engagement (such as, for example, 100-200 milliseconds). The predetermined amount of time may be determined based on past experience and/or based on simulations. As explained previously, the control unit 50 may determine successful completion of gear engagement by any means. In some embodiments, a gear engagement signal $G_e$ from the sensor 64 may indicate that the requested gear engagement was successfully completed. If the signal ($G_e$) is not received (or a signal indicative of lack of gear engagement is received) within the predetermined amount of time, the control unit 50 may determine that the requested gear engagement was not successfully completed.

If the control unit 50 determines that the gear engagement was not successfully completed, the control unit 50 may initiate a torque jog algorithm 80 (step 150) to induce a torque jog on the electric motor 38. The torque jog algorithm 80 may send one or more motor control signals 82 from control unit 50 to the electric motor 38 (see FIG. 2) to induce the torque jog. In some embodiments, after initiating a first torque jog, the control unit 50 may again determine if gear engagement is successful. If successful gear engagement is not detected within the predetermined time, the control unit 50 may again initiate the torque jog algorithm 80 to activate a second torque jog. After successful gear engagement is detected, the control unit 50 may continue with its normal operation (step 160). In some embodiments, the control unit 50 may initiate the torque jog algorithm 80 only a fixed number of times (for example, once, twice, etc.). In some embodiments, the torque jog algorithm 80 may be initiated the first time the gears do not successfully engage and a different torque jog algorithm (for example, one of FIGS. 6A-6D) may be initiated the second time the gears do not successfully engage.

Figure 5B:
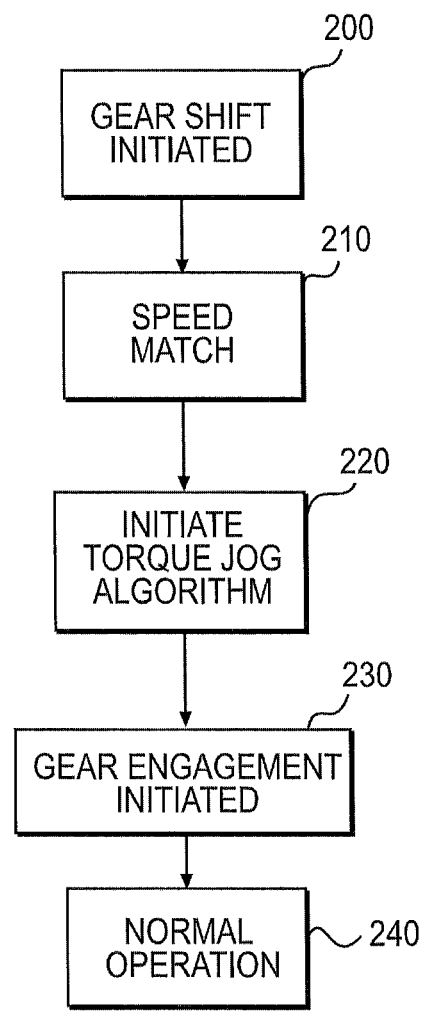
FIG. 5B is a flow chart illustrating another exemplary method of gear shifting in the bus of FIG. 1.

FIG. 5B is a flow chart that illustrates another exemplary gear engagement method of the control unit 50. In the embodiment of FIG. 5B, when a gear shift is initiated (step 200), the control unit 50 may first control the motor current to match the speed of the input shaft 42 with the speed of the output shaft 44 (step 210). The control unit 50 may then initiate the torque jog algorithm 80 (step 220) before it initiates gear engagement (step 230). That is, in this embodiment, the control unit 50 applies a torque jog on the electric motor 38 before every instruction 70 (FIG. 2) to engage the gears in the transmission 40. After initiating gear engagement, the control unit 50 may continue normal operation (step 240) until another gear shift is desired.

When another gear shift is desired, the control unit 50 may follow the method of FIG. 5A or the method of FIG. 5B. That is, in some embodiments, when another gear shift is desired, the control unit 50 may first initiate gear engagement, and then determine if the requested gear engagement was successful before initiating the torque jog algorithm 80 (FIG. 5A). Alternatively, the control unit 50 may initiate a torque jog algorithm 80 before it initiates gear engagement (FIG. 5B). In some embodiments, the control unit 50 may select the gear shift method (FIG. 5A or FIG. 5B) based on the gear it is shifting into. In some embodiments, the control unit 50 may follow the method of FIG. 5A for shifting between gears while the bus is in motion, and the method of FIG. 5B for shifting gears while at rest.

As previously explained, the torque jog algorithm 80 may control (for example, vary) the current input to the electric motor 38 to induce a variation (or torque jog) in the motor output. The torque jog may result in a torque fluctuation at the input shaft 42. The resulting change in speed of the input shaft 42 may result in relative rotation between the engaging gears. The relative rotation may assist in gear engagement. In general, the torque jog algorithm 80 may direct any current pattern to the electric motor 38 that provides a variation in its output. Although not a limitation, in some embodiments, a torque jog may result in a 1-20% fluctuation in the output torque of electric motor 38. In some embodiments, a torque jog may result in a 1-10% fluctuation in the motor torque. For example, if during an exemplary operation, the electric motor 38 is producing a torque of about 1000 N-m, a 5% torque jog may cause the output torque to vary from about 950 N-m to about 1050 N-m, and a 10% torque jog may cause the output torque to vary from about 900 N-m to about 1100 N-m. In some embodiments, the torque fluctuations caused by a torque jog may terminate in less than or equal to about 500 milliseconds (≤about 500 ms). That is, a torque jog may be completed in ≤about 500 ms. In some embodiments, a torque jog may be complete in ≤about 200 ms, or ≤about 150 ms.

Figure 6B:
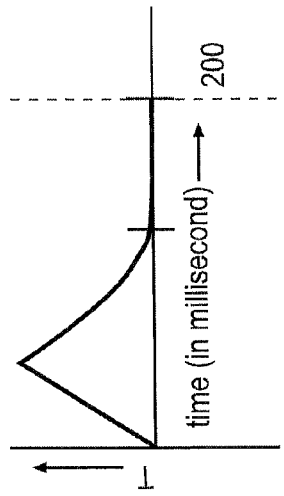
FIGS. 6A-6D are schematic illustrations of torque jog initiated by a control unit in the bus of FIG. 1.
Figure 6D:
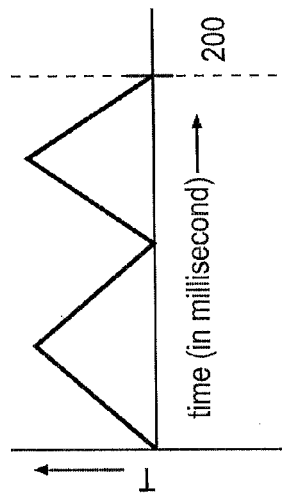
Figure 6A:
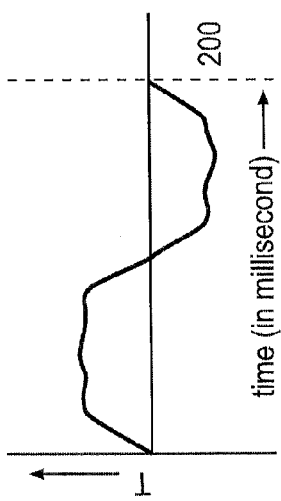

FIGS. 6A-6D illustrate a few exemplary torque jogs that may be initiated by the torque jog algorithm 80. The x-axis of FIGS. 6A-6D shows the time in milliseconds, and the y-axis shows the torque output of the electric motor 38. Since motor torque is proportional to the current input into the electric motor 38, the y-axis of FIGS. 6A-6D also indicative of the current input into the electric motor 38. In the embodiments illustrated in FIGS. 6A-6C, the torque jog algorithm 80 induces the motor torque to fluctuate above and below its steady state torque $T_1$ (the torque output of the motor at that time). In the embodiment of FIG. 6A, the torque jog increases the motor torque to $T_1 + \Delta T$ and then decreases it to $T_1 - \Delta T$ within a time $t_1$ ms. As explained previously, in some embodiments, $\Delta T$ may vary between about 1-20% of $T_1$, or between about 1-10% of $T_1$, and $t_1$ may be ≤about 500 ms, ≤about 200 ms, or ≤about 150 ms.

As illustrated in FIG. 6B, in some embodiments, the amount by which the torque is increased (from the steady state torque) may be different than the amount by which the torque is decreased. For example, as illustrated in FIG. 6B, the motor output torque may be increased by $\Delta T_1$ from $T_1$, and decreased by $\Delta T_2$ from $T_1$. Both $\Delta T_1$ and $\Delta T_2$ may vary between the same ranges discussed above. A torque jog may comprise any number of torque increases and decreases. In some embodiments, as illustrated in FIG. 6A, a torque jog may include only a single torque increase and a single torque decrease, while in other embodiments, a torque jog may include several torque increases and/or decreases (see FIGS. 6B and 6C).

Figure 6C:
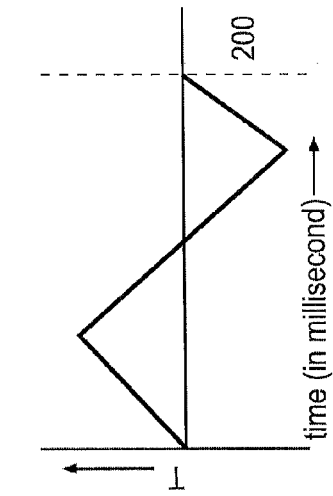

Although FIG. 6A illustrates a torque jog in which the output torque is maintained substantially constant (for a fixed time) at the upper and lower ends (that is, at $T_1 + \Delta T$ and $T_1 - \Delta T$), this is not a requirement. As illustrated in FIGS. 6B and 6C, the torque fluctuations may have any pattern. Although FIGS. 6A-6C illustrate torque jogs in which the motor output torque is first increased and then decreased, this is not a requirement. In some embodiments, the motor output torque may first be decreased and then increased (that is, $T_1 - \Delta T_2$ followed by $T_1 + \Delta T_1$). Further, as illustrated in FIG. 6D, in some embodiments of torque jog, the motor output torque may only be increased (or decreased). This increase or decrease in torque may be repeated any number of times and may have any pattern (as described with reference to FIGS. 6A-6C).

While principles of the present disclosure are described herein with reference to gear engagement in the transmission for an electric vehicle, it should be understood that the disclosure is not limited thereto. Rather, the systems and methods described herein may be employed to promote gear engagement in any machine. Also, those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. A method of controlling a transmission of a vehicle powered by an electric motor, comprising:
   initiating a gear engagement in the transmission when the vehicle is in motion; and
   activating a torque jog in the electric motor to assist with the gear engagement, wherein the torque jog includes a fluctuation in the torque output of the electric motor above and below a fixed value.

2. The method of claim 1, further including determining whether or not a successful gear engagement occurred within a predetermined time period after initiating the gear engagement.

3. The method of claim 2, wherein the torque jog is activated if a successful gear engagement did not occur within the predetermined time period.

4. The method of claim 1, further including initiating a gear shift before initiating the gear engagement, wherein the gear shift includes a downshift.

5. The method of claim 1, further including initiating a gear shift before initiating the gear engagement, wherein the gear shift includes an upshift.

6. The method of claim 1, wherein the fluctuation in torque output terminates in less than or equal to 500 milliseconds.

7. The method of claim 1, wherein the fluctuation in torque output includes increasing the torque output by about 1-20% from the fixed value, and decreasing the torque output by about 1-20% from the fixed value.

8. A method of controlling a transmission of a vehicle powered by an electric motor, comprising:
   initiating a gear engagement in the transmission;
   determining whether or not a successful gear engagement occurred in response to the initiation; and
   activating a torque jog in the electric motor based on the determination, wherein the torque jog includes a fluctuation in the torque output of the electric motor above and below a fixed value to assist with the gear engagement, the fluctuation including increasing the torque output by about 1-20% from the fixed value, and decreasing the torque output by about 1-20% from the fixed value.

9. The method of claim 8, wherein the determining includes determining whether or not a successful gear shift occurred within a predetermined time period.

10. The method of claim 8, wherein the fluctuation in torque output ends in less than or equal to 500 milliseconds.

11. The method of claim 8, wherein activating the torque jog includes activating the torque jog only if successful gear engagement did not occur in response to the initiation.

12. The method of claim 8, wherein determining whether or not a successful gear engagement occurred includes receiving a signal indicative of gear engagement within a predetermined time.

13. The method of claim 8, wherein activating the torque jog includes activating the torque jog a predetermined time after initiating the gear engagement.

14. The method of claim 8, wherein the electric vehicle is an electric bus.

15. The method of claim 8, wherein the electric vehicle is a low-floor electric bus.

16. An electric vehicle, comprising:
   an electric motor configured to provide traction for the electric vehicle;
   a transmission coupled to the electric motor, the transmission including a plurality of gears therein; and
   a control unit operatively coupled to the transmission and the electric motor, wherein the control unit is configured to:
      initiate a gear engagement in the transmission when the vehicle is in motion; and
      activate a torque jog in the electric motor to assist with the gear engagement, wherein the torque jog includes a fluctuation in the torque output of the electric motor above and below a fixed value.

17. The electric vehicle of claim 16, further including a sensor associated with the transmission, the sensor being configured to detect whether or not a successful gear engagement occurred in response to the initiation of gear engagement.

18. The electric vehicle of claim 17, wherein the control unit is configured to activate the torque jog only if successful gear engagement is not detected within a predetermined time.

19. The electric vehicle of claim 16, wherein the fluctuation ends in less than or equal to 500 milliseconds.

20. The electric vehicle of claim 16, wherein the fluctuation in torque output includes increasing the torque output by about 1-20% from the fixed value, and decreasing the torque output by about 1-20% from the fixed value.

21. A method of controlling a transmission of a vehicle powered by an electric motor, comprising:
   initiating a gear engagement in the transmission; and
   activating a torque jog in the electric motor to assist with the gear engagement, wherein the torque jog includes a fluctuation in the torque output of the electric motor, and wherein the torque jog is activated before initiating the gear engagement.

22. The method of claim 21, further including initiating a gear shift prior to the initiation of the gear engagement.

23. The method of claim 21, wherein the torque jog includes a fluctuation in the torque output of the electric motor above a fixed value or below a fixed value.

24. The method of claim 21, wherein the torque jog includes a fluctuation in the torque output of the electric motor above and below a fixed value.

25. The method of claim 21, wherein the vehicle is a bus.

26. The method of claim 21, wherein the vehicle is a low-floor bus.

27. The method of claim 21, wherein the fluctuation ends in less than or equal to 500 milliseconds.

\* \* \* \* \*